(12) United States Patent
Patrick

(10) Patent No.: US 8,032,747 B2
(45) Date of Patent: *Oct. 4, 2011

(54) COMPARISON OF DOCUMENTS POSSESSED BY TWO PARTIES

(75) Inventor: Kyle Nathan Patrick, British Columbia (CA)

(73) Assignee: International Business Machines Corporation, Armonk, NY (US)

( * ) Notice: Subject to any disclaimer, the term of this patent is extended or adjusted under 35 U.S.C. 154(b) by 723 days.

This patent is subject to a terminal disclaimer.

(21) Appl. No.: 12/015,536

(22) Filed: Jan. 17, 2008

(65) Prior Publication Data

US 2008/0141030 A1    Jun. 12, 2008

Related U.S. Application Data

(63) Continuation of application No. 11/949,117, filed on Dec. 3, 2007, now abandoned, which is a continuation of application No. 10/621,731, filed on Jul. 17, 2003, now Pat. No. 7,337,319.

(51) Int. Cl.
*H04L 9/00* (2006.01)
(52) U.S. Cl. .................. 713/168; 713/169; 713/176
(58) Field of Classification Search .................. None
See application file for complete search history.

(56) References Cited

U.S. PATENT DOCUMENTS

| 5,651,069 A | 7/1997 | Rogaway |
| 5,790,669 A | 8/1998 | Miller et al. |
| 6,167,521 A | 12/2000 | Smith et al. |
| 6,681,017 B1 | 1/2004 | Matias et al. |
| 7,134,018 B2 | 11/2006 | Riordan |
| 2001/0044895 A1 | 11/2001 | Hada |
| 2002/0049601 A1 | 4/2002 | Asokan et al. |
| 2003/0093680 A1 | 5/2003 | Astley et al. |

FOREIGN PATENT DOCUMENTS

| JP | 11234259 | 8/1999 |
| JP | 11234263 | 8/1999 |
| WO | WO00/48358 | 8/2000 |
| WO | WO00/65426 | 11/2000 |

OTHER PUBLICATIONS

Schneier, "Applied Cryptography", 1996, John Wiley & Sons, 2$^{nd}$ Edition, pp. 30-31.*

Research Disclosure "A Strong Client-Server Mutual Authentication Scheme"; Disclosed by International Business Machines Corporation No. 41787; Jan. 1999; p. 129.

Abe, M.; Securing "Enrcryption + Proof of Knowledge" in the Random Oracle Model; NTT Information Sharing Platform Labs.; Nippon Telegraph and Telephone Corporation; The Cryptographers' Track at the RSA Conference 2002, San Jose, CA, USA, Feb. 18-22, 2002; Proceedings pp. 277-289.

(Continued)

*Primary Examiner* — Minh Dinh

(74) *Attorney, Agent, or Firm* — Schmeiser, Olsen & Watts; John Pivnichny

(57) ABSTRACT

A method of zero-knowledge document comparison between two parties. Each party performs: exchanging a set of random data and a shared hash function, applying the hash function to concatenations of the document and the sets of random data, and comparing the hashes.

15 Claims, 2 Drawing Sheets

OTHER PUBLICATIONS

Peyravian, et al.; Hash-Based Encryption System; Computers & Security vol. 18, No. 4, 1999; pp. 345-350.

Yuh-Shihng Chang et al.; Group-oriented authentication mechanism with key exchange; Department of Information Management, Computer Communications, vol. 21, No. 5, May 15, 1998; pp. 485-497.

Aura, Tuomas; Strategies Against Replay Attacks; Digital Systems Laboratory, Helsinki University of Technology; IEEE, 1997; pp. 59-68.

Rangan, P. Venkat; Trust Requirements and Performance of a Fast Subtransport-Level Protocol for Secure Communication; IEEE Transactions on Software Engineering, vol. 19, No. 2, Feb. 1993; pp. 181-186.

Maurer et al.; Unconditionally Secure Key Agreement and the Intrinsic Conditional Information; IEEE Transactions on Information Theory, vol. 45, No. 2, Mar. 1999; 16 pages.

Halevi et al.; Public-Key Cryptography and Password Protocols; ACM Transactions on Information and System Security, vol. 2, No. 3, Aug. 1999; pp. 230-268.

Park et al.; Security Protocol for IEEE 802.11 Wireless Local Area Network; Mobile Networks and Applications 3; 1993; pp. 237-246.

Brassard et al.; Computationally Convincing Proofs of Knowledge; Lecture Notes in Computer Science; 1991; 12 pages.

Feige et al.; Zero Knowledge Proofs of Knowledge in Two Rounds; Proceedings on Advances in Cryptology; 1989; pp. 526-544.

Menezes et al.; Handbook of Applied Cryptography; 1997; CRC Press; pp. 352-359, 397-417.

Notice of Allowance (Mail Date Sep. 4, 2009) for U.S. Appl. No. 11/949,117, filed Dec. 3, 2007, Confirmation No. 4154.

Fagin et al.; "Comparing Information Without Leaking It", ACM, 1996, Retrieved from the Internet on Aug. 19, 2009: <URL: http://citeseerx.ist.psu.edu/viewdoc/summary?doi=10.1.1.50.5059>.

* cited by examiner

COMPARISON OF DOCUMENTS POSSESSED BY TWO PARTIES

This application is a continuation application claiming priority to Ser. No. 11/949,117, filed Dec. 3, 2007, which is a continuation application of Ser. No. 0/621,731, filed Jul. 17, 2003.

TECHNICAL FIELD

The invention relates to the field of cryptography and more particularly to zero-knowledge methods for comparing documents between two parties.

BACKGROUND ART

A zero-knowledge protocol, as in other types of interactive proofs, is a protocol between two parties in which one party (the prover), tries to prove a fact to the other party (the verifier). The fact is typically secret information such as a password or, in cryptographic applications, the private key of a public key encryption algorithm. In zero-knowledge protocols, the prover can convince the verifier that he is in possession of the secret without revealing the secret itself. In particular, zero-knowledge protocols are cryptographic protocols in which: 1) the verifier cannot learn anything from the protocol—no knowledge is transferred; 2) the prover cannot cheat the verifier and vice versa; and 3) the verifier cannot pretend to be the prover to any third party. Thus in a zero-knowledge protocol the fact or secret itself, or any other useful information, is not revealed to the other party during the protocol, nor to any eavesdropper. The Fiat-Shamir protocol was the first practical zero-knowledge cryptographic protocol.

Hash functions are commonly used in cryptography. A one-way hash function is a function that takes a variable-length input string and converts it into a fixed-length output string. An example of such a hash function is the SHA-1 function. It is impossible to determine the input string from the hashed string.

In some situations where A and B are two distrustful parties, it may be necessary for the parties to learn whether two documents which are possessed by the respective parties are the same or substantially the same. For example, B may claim to have a copy of A's secret document and A's course of action may hinge on whether B's claim is true. Neither party however can disclose their respective document to the other in order to verify B's claim without destroying their secrecy. While the use of zero-knowledge protocols is known for exchanging secret keys it has not been used for comparing documents.

There is a need therefore a strong zero-knowledge document comparison method between mutually distrustful parties.

DISCLOSURE OF INVENTION

The present invention therefore provides a method of securely comparing a first document in possession of a first party and a second document in possession of a second party, without revealing the contents of the first document to the second party or the contents of the second document to the first party, said method comprising the steps of:
 i) said first and second parties each generating its own set of random data;
 ii) each party exchanging the set of random data and a shared hash function with the other party;
 iii) each party computing a first value consisting of the output of the shared hash function where the input to the hash function is the consecutive concatenation of the document in each party's possession, followed by that party's set of random data, followed by the other party's set of random data;
 iv) each party computing a second value consisting of the output of the shared hash function where the input to the hash function is the consecutive concatenation of the document in each party's possession, followed by the other party's set of random data, followed by that party's set of random data;
 v) each party sending its first value to the other party and receiving the other party's first value; and
 vi) each party comparing the other party's first value to its second value;
 vii) each party concluding that if the values are the same, then the two documents are the same, but that otherwise the two documents are different.

The invention further provides a computer program product and an article for carrying out the method.

BRIEF DESCRIPTION OF DRAWINGS

In drawings which disclose a preferred embodiment of the invention.

BEST MODE(S) FOR CARRYING OUT THE INVENTION

Figure 1:
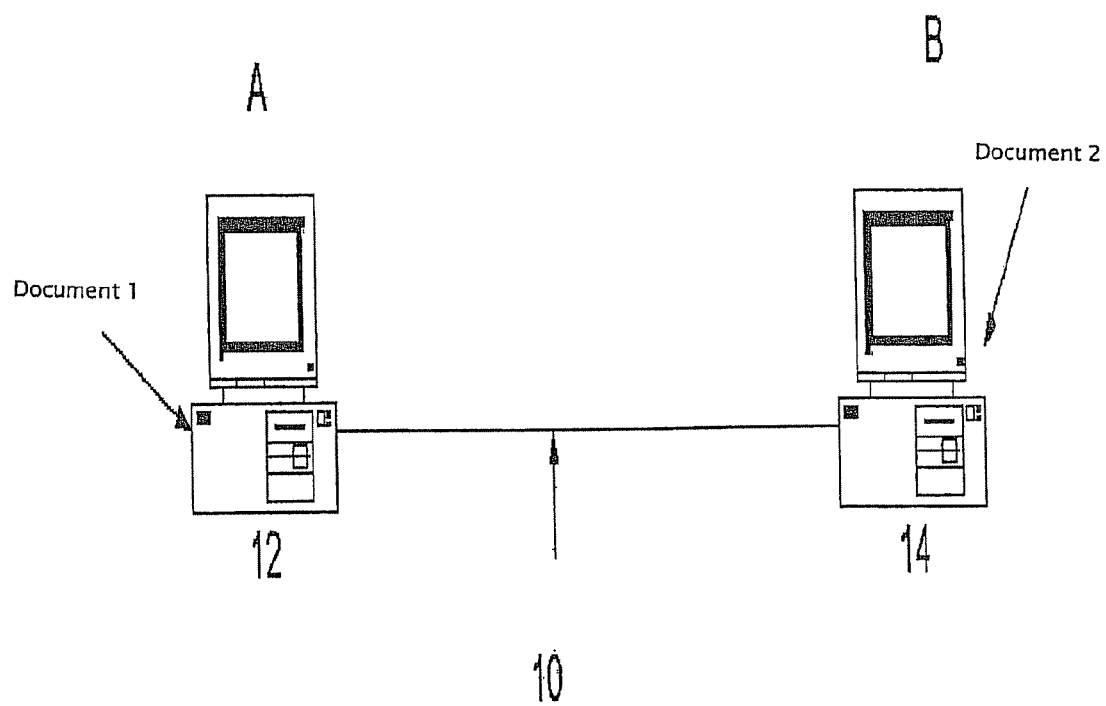
FIG. 1 is a schematic illustration of a computer network according to the present invention.
Figure 2:
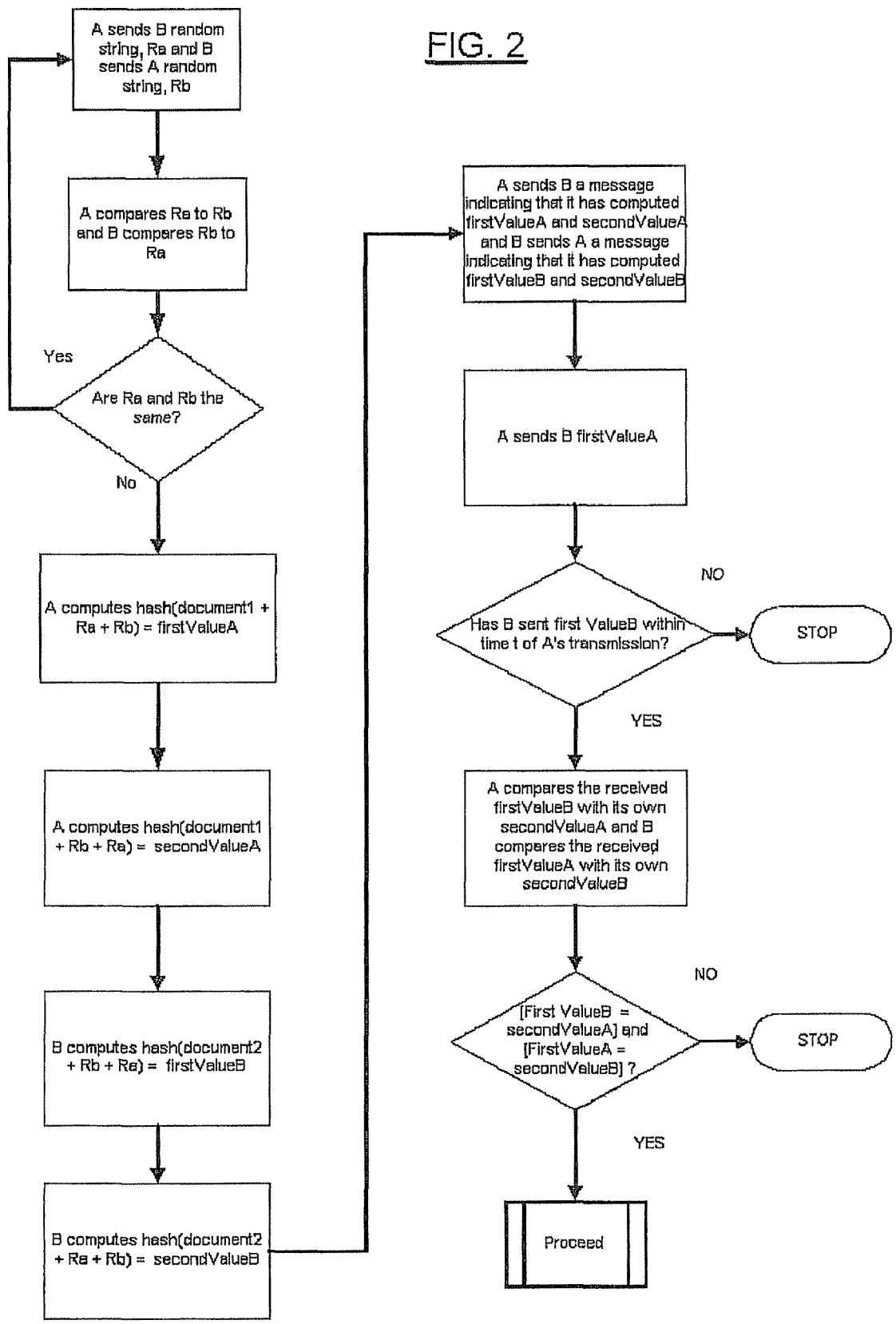
FIG. 2 is a flow chart illustrating the method of the invention.

With reference to FIG. 1, a communications link, such as a computer network, is designated generally as 10. Parties A and B, who distrust each other, communicate between their respective computers 12 and 14, which have central processors and are capable of generating random numbers, and comparing numbers. A possesses a document containing information, in electronic form or otherwise, referred to as document1. B possesses a document containing information, in electronic form or otherwise, referred to as document2. Parties A and/or B, would like to take some further action only if one or the other or both can be assured that they both have the same document. They may not care to know each other's identity.

If the respective documents, document1 and document2, are not already in the form of a bit string, they are scanned or otherwise converted to that format. Next, A sends B a collection of random bits, Ra, preferably incorporating a timestamp. B sends A a collection of random bits, Rb, preferably incorporating a timestamp. A compares Ra to Rb and aborts the comparison if they are the same, since the comparison will only work if the random numbers generated by A and B are different. Similarly B compares Rb to Ra and aborts the comparison if they are the same. They will then restart and generate fresh random numbers if they wish to continue.

Once A and B have exchanged non-identical random strings Ra and Rb, and have agreed on one-way hash functions $H_1$, $H_2$, A computes first ValueA by concatenating document1 with Ra and Rb, in that order, to form a string document1+Ra+Rb, in that order and then applying to that string a one-way hash function $H_1$. Any suitable cryptographic one-way hash function, such as the SHA-1 function, may be used. A then computes second ValueA by concatenating document1+Rb+Ra, in that order, and applying to it one-way hash function $H_2$. Similarly B computes first ValueB by concatenating document2 with Rb and Ra, in that order, to form a string document2+Rb+Ra, in that order, and then applying to that string one-way hash function $H_2$. B then computes second ValueB by concatenating document2 with Ra and Rb, in that order, to form a string document2+Ra+Rb, in that order, and then applying to that string a one-way hash function $H_1$. Hash functions $H_1$ and $H_2$ may be the same.

It has been agreed upon beforehand that A will transmit the encrypted string first ValueA first to B, although the method will work regardless of which party sends the encrypted string to the other first. Upon completion of the foregoing steps, A sends B a message indicating that it has computed first ValueA and second ValueA, and either before, after, or at the same time as A sends that message, B sends A a message indicating that it has computed first ValueB and second ValueB. A then sends B first ValueA. B sends A first ValueB immediately upon receipt of A's first ValueA. If A does not receive B's first ValueB within a few milliseconds (in the absence of some other explanation such as a communication breakdown), A knows B did not have the same document and is trying to gain an advantage over A.

If A receives B's first ValueB in a timely way, A compares the received first ValueB with its own second ValueA. B also compares the received first ValueA with its own second ValueB. If the comparisons fail, then A and B know they statistically have different documents, and if the comparison does not fail, then statistically they have the same document. With that knowledge they may then proceed with their intended actions, or not.

Such comparisons may allow for a certain statistical dissimilarity in the strings or range of equivalence. A strict application of a hash function such as SHA-1 to a bit stream, such as a document, will produce a value that is statistically impossible to produce by supplying a second different meaningful bit stream. A strict application of the hash function does not allow for variance resulting from transmission errors or conversion between formats. Such variances would typically result in different hash codes. However, it is possible to describe a process where minor variation in the source can be handled. A document may be normalized before being passed to a hash function, or a hash function could be constructed that handles the normalization internally as part of the implementation. In this way inconsequential differences in the documents such as case type and spacing can be ignored.

For example, the parties could agree that whitespace (such as spaces, tabs and carriage returns) and character case are insignificant. The document could then be converted to a normalized form where there is no whitespace and all the characters are lowercase. The other approach would be to make the hash function ignore whitespace and change characters to lowercase before injection into the rest of the algorithm.

Thus it will be seen that according to this method, A and/or B cannot prove anything to a third party without revealing documents. A and B do not exchange the actual documents or hashed documents. Further, A or B cannot fool another party C into thinking it has the document by mirroring, resending or replaying the hash received from the other party to the third party. B cannot assert computational delay as they have previously asserted a pre-computation.

The present invention is described above as a computer-implemented method. It may also be embodied as a computer hardware apparatus, computer software code or a combination of same. The invention may also be embodied as a computer-readable storage medium embodying code for implementing the invention. Such storage medium may be magnetic or optical, hard or floppy disk, CD-ROM, firmware or other storage media. The invention may also be embodied on a computer readable modulated carrier signal.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

The embodiments of the invention in which an exclusive property or privilege is claimed are defined as follows:

The invention claimed is:

1. A method of securely ascertaining whether a first document (D1) in possession of a first party and a second document (D2) in possession of a second party are a same document, without the content of D1 being revealed to the second party and without the content of D2 being revealed to the first party, said method comprising the steps of:
  i) said first party generating a first set of random data (Ra) and sending Ra to the second party;
  ii) after step i), said first party receiving from the second party a second set of random data (Rb) and determining that Rb differs from Ra;
  iii) after step ii), said first party forming: a Value (Va1) consisting of a one-way hash (H1) of an ordered concatenation D1 +Ra +Rb; and a Value (Va2) consisting of a one-way hash (H2) of an ordered concatenation D1 +Rb +Ra;
  iv) after step iii), said first party sending a first message to the second party indicating that the first party has computed Va1 and Va2;
  v) after step iii), said first party receiving a second message from the second party indicating that the second party has computed a Value Vb1 and a Value Vb2, wherein Vb1 consists of the one-way hash H2 of an ordered concatenation D2 +Rb +Ra, and wherein Vb2 consists of the one-way hash H1 of an ordered concatenation D2 +Ra +Rb;
  vi) after steps iv) and v), said first party sending Va1 to the second party;
  vii) said first party receiving Vb1 from the second party and determining that said first party has received Vb1 from the second party within a specified time interval following step vi);
  viii) after step vii), said first party determining whether Vb1 is equal to Va2;
  ix) if in step viii) said first party has determined that Vb1 is equal to Va2, then said first party ascertaining that D1 and D2 are the same document;
  x) if in step viii) said first party has determined that Vb1 is not equal to Va2, then said first party ascertaining that D1 and D2 are different documents.

2. The method of claim 1, wherein in step viii) said first party has determined that Vb1 is equal to Va2.

3. The method of claim 1, wherein in step viii) said first party has determined that Vb1 is not equal to Va2.

4. The method of claim 1, wherein H1 and H2 are a same one-way hash function.

5. The method of claim 1, wherein H1 and H2 are different one-way hash functions.

6. A computer program product comprising a computer readable storage device having computer readable program code means embodied in said storage device, said program code configured to perform a method of securely ascertaining whether a first document (D1) in possession of a first party and a second document (D2) in possession of a second party are a same document, without the content of D1 being revealed to the second party and without the content of D2 being revealed to the first party, said method comprising the steps of:

i) said first party generating a first set of random data (Ra) and sending Ra to the second party;

ii) after step i), said first party receiving from the second party a second set of random data (Rb) and determining that Rb differs from Ra;

iii) after step ii), said first party forming: a Value (Va1) consisting of a one-way hash (H1) of an ordered concatenation D1 +Ra +Rb; and a Value (Va2) consisting of a one-way hash (H2) of an ordered concatenation D1 +Rb +Ra;

iv) after step iii), said first party sending a first message to the second party indicating that the first party has computed Va1 and Va2;

v) after step iii), said first party receiving a second message from the second party indicating that the second party has computed a Value Vb1 and a Value Vb2, wherein Vb1 consists of the one-way hash H2 of an ordered concatenation D2 +Rb +Ra, and wherein Vb2 consists of the one-way hash H1 of an ordered concatenation D2 +Ra +Rb;

vi) after steps iv) and v), said first party sending Va1 to the second party;

vii) said first party receiving Vb1 from the second party and determining that said first party has received Vb1 from the second party within a specified time interval following step vi);

viii) after step vii), said first party determining whether Vb1 is equal to Va2;

ix) if in step viii) said first party has determined that Vb1 is equal to Va2, then said first party ascertaining that D1 and D2 are the same document;

x) if in step viii) said first party has determined that Vb1 is not equal to Va2, then said first party ascertaining that D1 and D2 are different documents.

7. The computer program product of claim 6, wherein in step viii) said first party has determined that Vb1 is equal to Va2.

8. The computer program product of claim 6, wherein in step viii) said first party has determined that Vb1 is not equal to Va2.

9. The computer program product of claim 6, wherein H1 and H2 are a same one-way hash function.

10. The computer program product of claim 6, wherein H1 and H2 are different one-way hash functions.

11. A system comprising a computer, said computer comprising a processor and a computer readable memory unit coupled to the processor, said memory unit containing program code configured to be executed by the processor to implement a method of securely ascertaining whether a first document (D1) in possession of a first party and a second document (D2) in possession of a second party are a same document, without the content of D1 being revealed to the second party and without the content of D2 being revealed to the first party, said method comprising the steps of:

i) said first party generating a first set of random data (Ra) and sending Ra to the second party;

ii) after step i), said first party receiving from the second party a second set of random data (Rb) and determining that Rb differs from Ra;

iii) after step ii), said first party forming: a Value (Va1) consisting of a one-way hash (H1) of an ordered concatenation D1 +Ra +Rb; and a Value (Va2) consisting of a one-way hash (H2) of an ordered concatenation D1 +Rb +Ra;

iv) after step iii), said first party sending a first message to the second party indicating that the first party has computed Va1 and Va2;

v) after step iii), said first party receiving a second message from the second party indicating that the second party has computed a Value Vb1 and a Value Vb2, wherein Vb1 consists of the one-way hash H2 of an ordered concatenation D2 +Rb +Ra, and wherein Vb2 consists of the one-way hash H1 of an ordered concatenation D2 +Ra +Rb;

vi) after steps iv) and v), said first party sending Va1 to the second party;

vii) said first party receiving Vb1 from the second party and determining that said first party has received Vb1 from the second party within a specified time interval following step vi);

viii) after step vii), said first party determining whether Vb1 is equal to Va2;

ix) if in step viii) said first party has determined that Vb1 is equal to Va2, then said first party ascertaining that D1 and D2 are the same document;

x) if in step viii) said first party has determined that Vb1 is not equal to Va2, then said first party ascertaining that D1 and D2 are different documents.

12. The system of claim 11, wherein in step viii) said first party has determined that Vb1 is equal to Va2.

13. The system of claim 11, wherein in step viii) said first party has determined that Vb1 is not equal to Va2.

14. The system of claim 11, wherein H1 and H2 are a same one-way hash function.

15. The system of claim 11, wherein H1 and H2 are different one-way hash functions.

* * * * *